United States Patent [19]
Murai et al.

[11] Patent Number: 4,644,635
[45] Date of Patent: Feb. 24, 1987

[54] MACHINING CENTER

[75] Inventors: Masayoshi Murai; Akira Fuyuki, both of Hiroshima, Japan

[73] Assignee: Mazda Motor Corporation, Hiroshima, Japan

[21] Appl. No.: 780,669

[22] Filed: Sep. 26, 1985

[30] Foreign Application Priority Data

Oct. 3, 1984 [JP] Japan ............................. 59-207520

[51] Int. Cl.$^4$ ............................................. B23Q 3/157
[52] U.S. Cl. ........................................ 29/568; 29/35.5; 29/48.5 R; 269/71; 408/71; 409/221
[58] Field of Search ................. 29/35.5, 48.5, 568; 74/813 R; 248/1 F, 276, 661; 269/71; 408/70, 71; 409/221

[56] References Cited

U.S. PATENT DOCUMENTS

| | | | |
|---|---|---|---|
| 4,204,304 | 5/1980 | Eidam | 29/26 A |
| 4,318,522 | 3/1982 | Appleberry | 248/276 |
| 4,358,888 | 11/1982 | Zankl et al. | 29/26 A |
| 4,401,400 | 8/1983 | Stark | 408/71 |
| 4,564,995 | 1/1986 | Kase | 29/26 A |

FOREIGN PATENT DOCUMENTS 171229 7/1983 Japan .

Primary Examiner—John Sipos
Assistant Examiner—Donald R. Studebaker
Attorney, Agent, or Firm—Gerald J. Ferguson, Jr.; Michael P. Hoffman; Ronni S. Malamud

[57] ABSTRACT

A machining center comprises a bed and an arch-shaped column having a pair of post portions spaced from each other in the transverse direction of the bed and a crossbeam portion connecting the post portions. A spindle head is supported on the crossbeam portion of the column to be movable both in the vertical direction and in the transverse direction of the bed and supports a spindle which is rotatable about a substantially vertical rotating shaft and on which a tool is demountably mounted. A base table is supported on the bed between the post portions of the column to be movable back and forth and a support supported on the base table by a supporting portion of the base table to be rotatable in an indexing manner about a rotating shaft inclined upward toward the front end thereof at 45° to the rotating shaft of the spindle. A turn table is provided on the support to be rotatable in an indexing manner about a rotating shaft at 45° to the rotating shaft of the support, and a tool magazine for storing a plurality of tools to be mounted on the spindle is disposed near the column. At least a part of the supporting portion of the base table for supporting said support is disposed between the post portions of the column.

4 Claims, 5 Drawing Figures

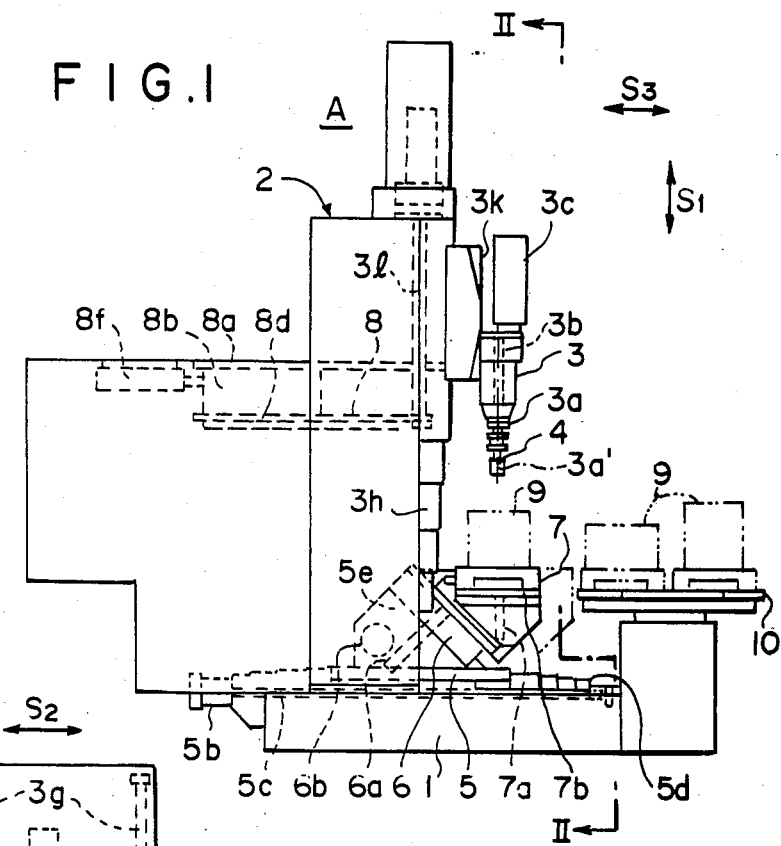
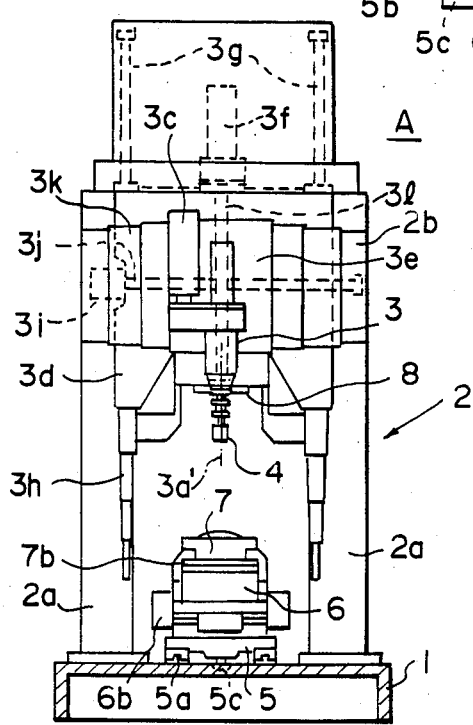

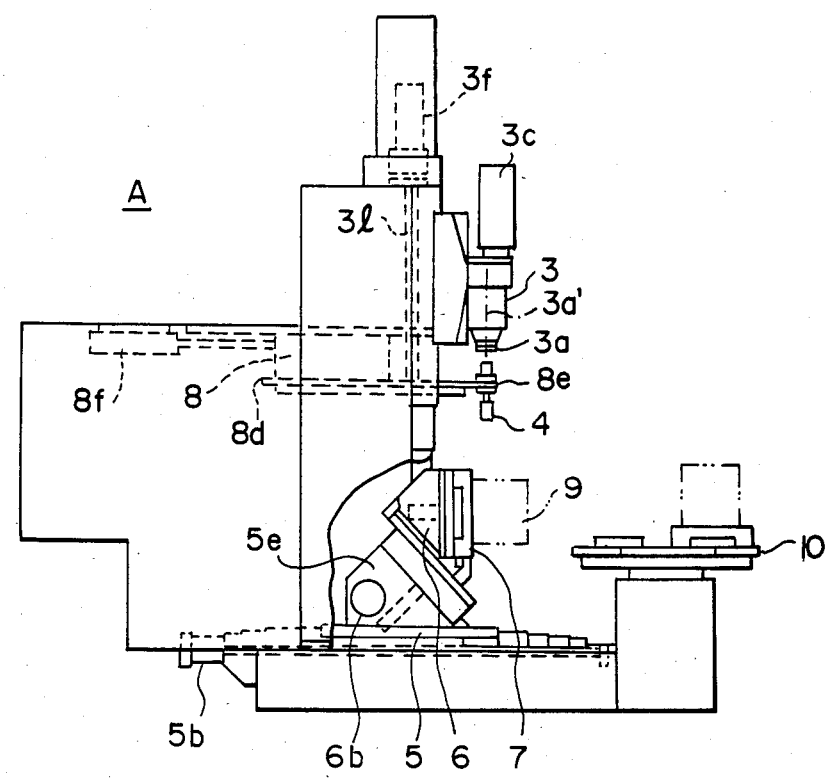
F I G. 5

4,644,635

MACHINING CENTER

BACKGROUND OF THE INVENTION

1. Field of the Invention

This invention relates to a machining center.

2. Description of the Prior Art

As disclosed in Japanese Unexamined Patent Publication No. 58(1983)-171229, for instance, there has been known a machining center comprising a support rotating about an axis at 45° to the rotating axis of a spindle, and a turn table rotating on the support about an axis at 45° to the rotating axis of the support. However, known machining centers of this type are disadvantageous in that since a column is provided opposed to the support and the turn table and the spindle head is supported on the column, the overall size of the machining center is enlarged, so it requires a large area to install it, and since the spindle head is directed substantially horizontally, the face of a workpiece to be worked is opposed to the column and is difficult to observe during working.

SUMMARY OF THE INVENTION

In view of the foregoing observations and description, the primary object of the present invention is to provide a machining center of the type described above which is small in size and in which the face of a workpiece to be worked can be easily observed during working.

The machining center of the present invention comprises a bed, an arch-shaped column having a pair of post portions spaced from each other in the transverse direction of the bed and a crossbeam portion connecting the post portions, a spindle head which is supported on the crossbeam portion of the column to be movable both in the vertical direction and in the transverse direction of the bed and supports a spindle which is rotatable about a substantially vertical rotating shaft and on which a tool is demountably mounted, a base table supported on the bed between the post portions of the column to be movable back and forth, a support supported on the base table by a supporting portion of the base table to be rotatable in an indexing manner about a rotating shaft inclined upward toward the front end thereof at 45° to the rotating shaft of the spindle, a turn table provided on the support to be rotatable in an indexing manner about a rotating shaft at 45° to the rotating shaft of the support, and a tool magazine which is for storing a plurality of tools to be mounted on the spindle and is disposed near the column, at least a part of the supporting portion of the base table for supporting said support being disposed between the post portions of the column.

In accordance with the present invention, the machining center can be small in size and can be provided in a relatively small area since the supporting portion of the base table for supporting the support is at least partly disposed between the post portions of the column. Further, since the spindle head is vertically directed, the face of the workpiece to be worked is easy to observe, thereby facilitating the working. Further, the support for supporting the turn table is supported on the base table to be rotatable in an indexing manner about a rotating shaft inclined upward toward the front end thereof at 45° to the rotating shaft of the spindle, so a mechanism for automatically changing the turn table can be easily disposed in an optimum position such as in front of the base table.

BRIEF DESCRIPTION OF THE DRAWINGS

FIG. 1 is a side view of a machining center in accordance with an embodiment of the present invention, FIG. 2 is a cross-sectional view taken along line II—II in FIG. 1, FIG. 5 is a side view for illustrating the operation of the machining center.

DESCRIPTION OF THE PREFERRED EMBODIMENT

Figure 3:
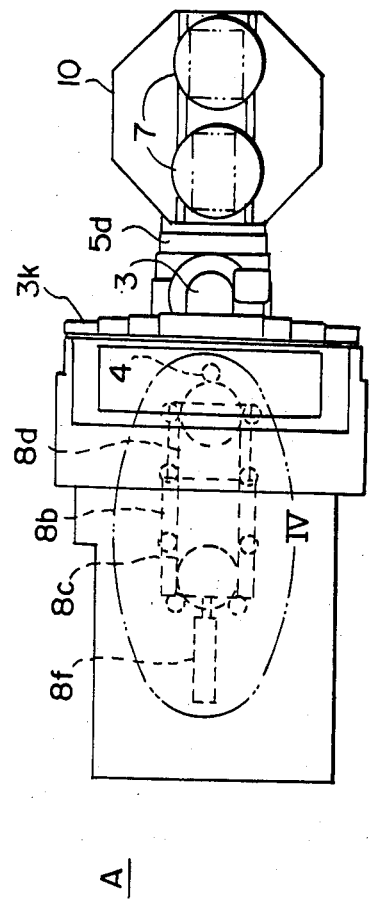
FIG. 3 is a plan view of the machining center.
Figure 4:
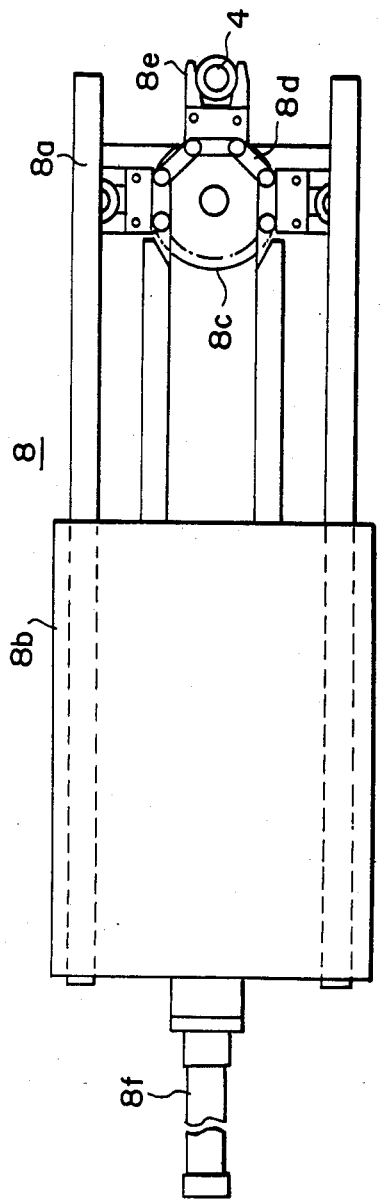
FIG. 4 is a plan view showing in detail the part indicated at IV in FIG. 3.

In FIGS. 1 to 4, a machining center A in accordance with an embodiment of the present invention includes an arch-shaped column 2 arching over a bed 1. The column 2 comprises a pair of post portions 2a standing upright from the bed 1 and a crossbeam portion 2b connecting the post portions at their top. A spindle head 3 is supported on the crossbeam portion 2b of the column 2 to be movable up and down, and right and left, as respectively shown by arrows S1 (FIG. 1) and S2 (FIG. 2). The spindle head 3 extends substantially vertically and supports a spindle 3a which is rotatable about a substantially vertically extending central axis 3a' and to which a tool 4 is removably mounted. On the bed 1 between the post portions 2a of the column 2 is supported a base table 5 to be movable back and forth in the directions shown by arrows S3 (FIG. 1). A support 6 is provided on the base table 5 to be rotatable in an indexing manner about a rotating shaft 6a which is inclined upwardly toward its front end at 45° to the rotating shaft 3b of the spindle 3a. A turn table 7 is provided on the support 6 to be rotatable in an indexing manner about a rotating shaft 7a inclined at 45° to the rotating shaft 6a of the support 6. Between the post portions 2a of the column 2 is disposed a tool magazine 8 for storing various tools 4 to be mounted on the spindle 3a. The tool magazine 8 is movable in the direction of the arrow S3 between a tool changing position shown in FIG. 5 and a retracted position shown in FIG. 1 retracted from the tool changing position by a predetermined distance. The rear portion of a supporting portion 5e of the base table 5 for supporting the support 6 is positioned between the post portions 2a of the column 2.

The spindle 3a is driven by a power unit 3c mounted on the spindle head 3. A vertical movement member 3d is provided to be movable up and down with respect to the column 2. A transverse movement member 3e is provided to be movable right and left with respect to the column 2. The spindle head 3 is supported on the transverse movement member 3e. A threaded rod 3l is engaged with the vertical movement member 3d so that the vertical movement member 3d is moved up and down by rotating the threaded rod 3l. The threaded rod 3l is rotated by a power unit 3f disposed on the crossbeam portion 2b of the column 2.

A pair of piston/cylinder units 3g are mounted on the top of the respective post portions 2a of the column 2. The lower end of the piston of each piston/cylinder unit 3g is fixed to the vertical movement member 3d so that the spindle 3, the vertical movement member 3d, the transverse movement member 3e and the like are support by the piston/cylinder units 3g, thereby facilitating up-and-down movement of the vertical movement member 3d by the power unit 3f.

The part of the column 2 along which the vertical movement member 3d is moved up and down is covered with a diaphragm member 3h. A threaded rod 3j is engaged with the transverse movement member 3e so that the transverse movement member 3e is moved right and left by rotating the threaded rod 3j. The threaded rod 3j is driven by a power unit 3i mounted on the vertical movement member 3d. The part of the vertical movement member 3d along which the transverse movement member 3e is moved right and left, and the threaded rod 3j are covered with a diaphragm member 3k.

The base table 5 is moved back and forth on the bed 1 under the guidance of guide members 5a. A threaded rod 5c is engaged with the base table 5 so that the base table 5 is slid back and forth by rotating the threaded rod 5c. The threaded rod 5c is driven by a power unit 5b. A diaphragm member 5d covers the guide members 5a and the threaded rod 5c.

A power unit 6b is accommodated in the base table 5 and the support 6 is rotated about the rotating shaft 6a in the indexing manner by the power unit 6b.

The turn table 7 has an upper face adapted to mount a workpiece 9, and is adapted to be rotated in an indexing manner by a rotating disk 7b which is rotated about a rotating shaft 7a driven by a power unit (not shown) accommodated in the support 6. The turn table 7 is laterally slid to be demountably mounted on the rotating disk 7b.

A table changer 10 is provided in front of the base table 5. The table changer 10 has a pair of table holders (not clearly shown) and is adapted to receive from the rotating disk 7b one turn table 7 bearing thereon a finished workpiece 9 and to deliver another turn table 7 bearing thereon a workpiece 9 to be processed.

The tool magazine 8 comprises a support frame 8b supported on a pair of guide rails 8a extending in the direction S3 between the post portions 2a of the column 2, a pair of chain sprockets 8c rotatably supported on front and rear end portions of the support frame 8b, an endless chain 8d passed around the chain sprockets 8c and engaged therewith and a plurality of gripping members 8e fixed to the endless chain 8d at equal distances. The endless chain 8d is fed stepwise by a distance equal to the distance between the gripping members by a power unit not shown. The support frame 8b is connected to a piston/cylinder unit 8f so that the support frame 8b or the tool magazine 8 is moved, by the piston/cylinder unit 8f, along the guide rails 8a between a tool changing position and a retracted position.

Now, the operation of the machining center A of this embodiment will be described.

In the condition shown in FIG. 1, the spindle head 3 is moved right/left and up/down by the power units 3f and 3i with the spindle 3a being rotated and the base table 5 is moved back/forth by the power unit 5b, and then the upper face of the workpiece 9 (which is a rectangular solid in this example) is processed with the tool 4.

Then the support 6 is indexed by 180° by the power unit 6b, whereby one of the side faces of the workpiece 9 is directed upward. After the upward directed side face is processed with the tool 4, the turn table 7 is indexed by 90°, whereby another side face of the workpiece 9 is directed upward. In this manner, all the side faces of the workpiece 9 are directed upward one by one to be processed with the tool 4.

After the upper face and the four side faces of the workpiece 9 are processed, the base table 5 is moved forward with the support 6 and the turn table 7 being positioned near the end face of the table changer 10 as shown by the chained line in FIG. 1 and the turn table 7 bearing thereon the finished workpiece 9 is transferred from the rotating disk 7b to the table changer 10 and then the other turn table 7 bearing thereon a new workpiece 9 to be processed is mounted on the rotating disk 7b.

When the tool 4 is to be changed, the vertical movement member 3d is moved upward by the power unit 3f so that the grip of the tool 4 on the spindle 3a is positioned at the same height as the gripping members 8e of the tool magazine 8 and the spindle head 3 is transversely centered by the power unit 3i. Then the piston/cylinder unit 8f is actuated to move forward the tool magazine 8 to the tool changing position shown in FIG. 5 with the gripping member 8 gripping no tool being forwardly positioned. At this time, the grip of the tool 4 on the spindle 3a abuts against the forwardly positioned gripping member 8e and opens the gripping member 8e, overcoming the force of a compression spring (not shown) built therein, to be gripped by the gripping member 8e. Then a tool mounting rod (not shown) is advanced to release the tool 4 on the spindle 3a therefrom and the spindle head 3 is moved upward. The endless chain 8d is fed stepwise until a desired tool 4 on the tool magazine 8 is brought vertically below the spindle head 3 and the spindle head 3 is moved downward. Then the tool mounting rod is retracted to permit the spindle 3a to grip the desired tool 4. Finally, the tool magazine 8 is retracted to the retracted position shown in FIG. 1, with the gripping member 8e which has gripped the desired tool 4 being automatically opened.

We claim:

1. A machining center comprising a bed, an arch shaped column having a pair of post portions spaced from each other in the transverse direction of the bed and a crossbeam portion connecting the post portions, a spindle head supported on the crossbeam portion of the column to be movable both in the vertical direction and in the transverse direction of the bed and supporting a spindle which is rotatable about a substantially vertical rotatable shaft on which a tool is demountably mounted, a base table supported on the bed between the post portions of the column to be movable back and forth, a support supported on the base table by a projected supporting portion of the base table to be rotatable in an indexing manner about a rotatable shaft inclined upwardly toward the front end thereof at 45° to the rotatable shaft of the spindle, a turn table provided on the support to be rotatable in an indexing manner about a rotatable shaft at 45° to the rotatable shaft of the support, and a tool magazine for storing a plurality of tools to be mounted on the spindle and disposed between upper parts of the post portions of the column, at least a part of the supporting portion of the base table for supporting said support being disposed between the post portions of the column.

2. A machining center as defined in claim 1 including means whereby said tool magazine is movable between a tool changing position in which the tool mounted on the spindle is changed and a position retracted from the tool changing position.

3. A machining center as defined in claim 1 including means supporting said spindle head on the crossbeam portion of the column by way of a vertical movement member supported on the crossbeam portion to be movable up and down with respect thereto and a transverse movement member supported on the vertical movement to be movable right and left with respect thereto.

4. A machining center as defined in claim 1 further comprising a table changer which is for changing the table supported on said support and is disposed in front of the base table.

* * * * *